Oct. 26, 1948.  F. J. SCHWARTZ  2,452,498
SEAM WELDING
Filed Oct. 7, 1947  2 Sheets-Sheet 1

Inventor
Fred J. Schwartz
By
Spencer, Willits, Helwig & Baillio
Attorneys

Oct. 26, 1948. F. J. SCHWARTZ 2,452,498
SEAM WELDING
Filed Oct. 7, 1947 2 Sheets-Sheet 2
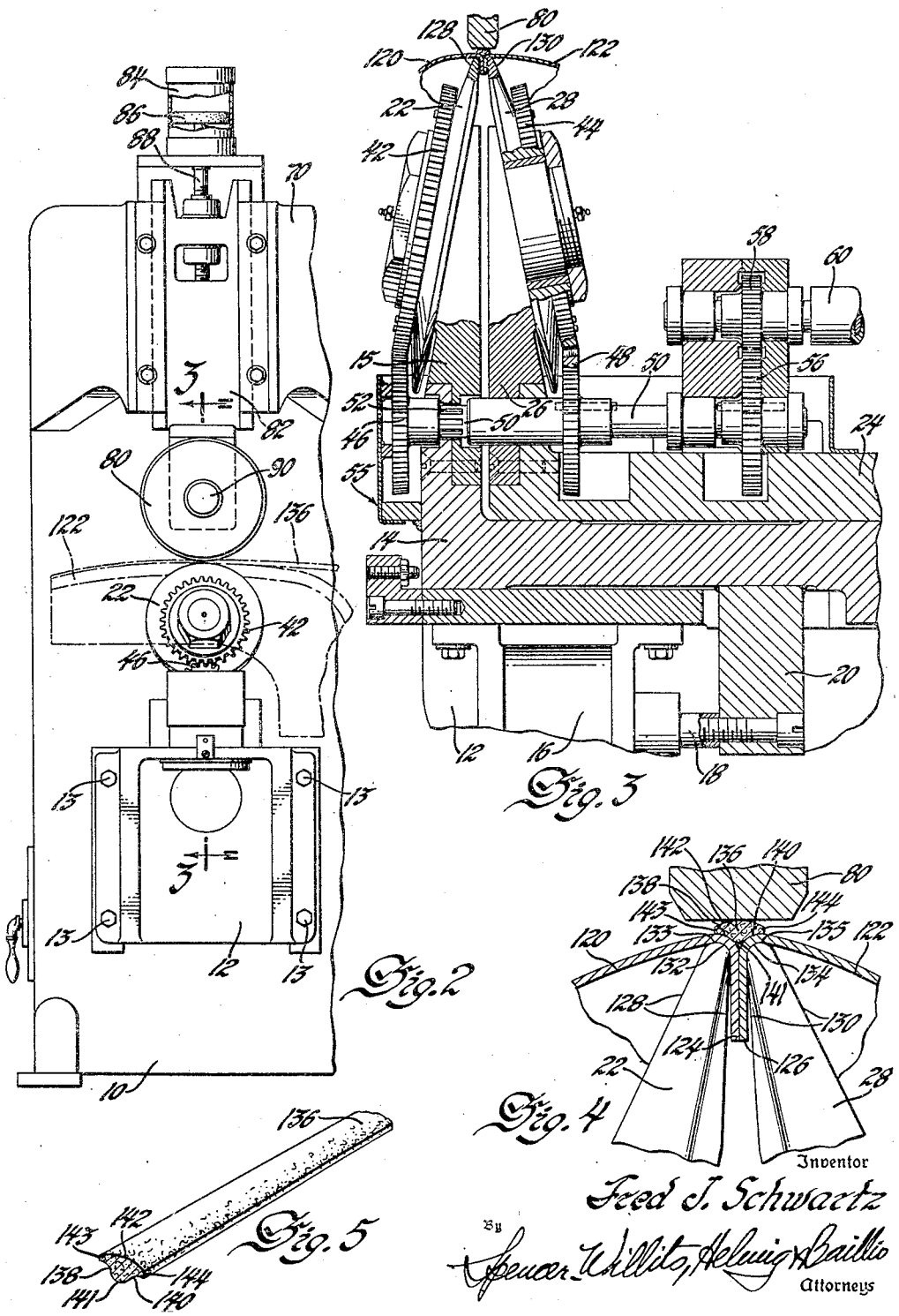
Inventor
Fred J. Schwartz
By Spencer Willits, Helwig & Baillie
Attorneys Patented Oct. 26, 1948

2,452,498

UNITED STATES PATENT OFFICE 2,452,498

SEAM WELDING

Fred J. Schwartz, Walled Lake, Mich., assignor to General Motors Corporation, Detroit, Mich., a corporation of Delaware Application October 7, 1947, Serial No. 778,493

6 Claims. (Cl. 219—4)

1

This invention relates generally to resistance welding and more particularly to seam welding of flanged parts.

Among the objects of the invention are the following: to provide improvements in a seam welding apparatus and process of the type in which the welding heat is obtained by means of the resistance of the parts to the flow of electric current; to provide improvements in a seam welding apparatus and process in which a welding wire or strip is resistance welded to the joint between a plurality of sheet metal parts; to provide improvements in a welding apparatus and process for resistance welding a welding wire or strip into the joint formed by a plurality of contacting flanged sheet metal parts; to provide an improved apparatus and process for welding a longitudinal seam between a pair of flanged sheet metal members by resistance welding a welding strip or wire to both parts and into the joint between the flanged parts, said welding strip or wire completely filling a generally V-shaped groove formed between the parts; to provide an improved form of welding strip adapted to be resistance welded to a plurality of flanged sheet metal members; and to provide an improved apparatus and process for welding a seam between a pair of flanged metal parts, said seam being curved in the direction of its length and a welding wire or strip being resistance welded to both of the flanged sheet metal parts and completely filling the joint.

Other objects and advantages of the invention will become more apparent from the following description and accompanying drawings.

In the drawings:

Figure 2 is a view with parts broken away of the machine of Figure 1, this view being taken at a right angle with respect to Figure 1 and looking toward the right in Figure 1.

Figure 3 is a sectional view on line 3—3 in Figure 2 looking in the direction of the arrows and showing the rotatable electrodes and associated parts.

Figure 4 is an enlarged view showing the electrodes contacting flanged parts and a welding wire or strip.

Figure 5 is a perspective view of a preferred form of welding wire or strip.

Figure 1:
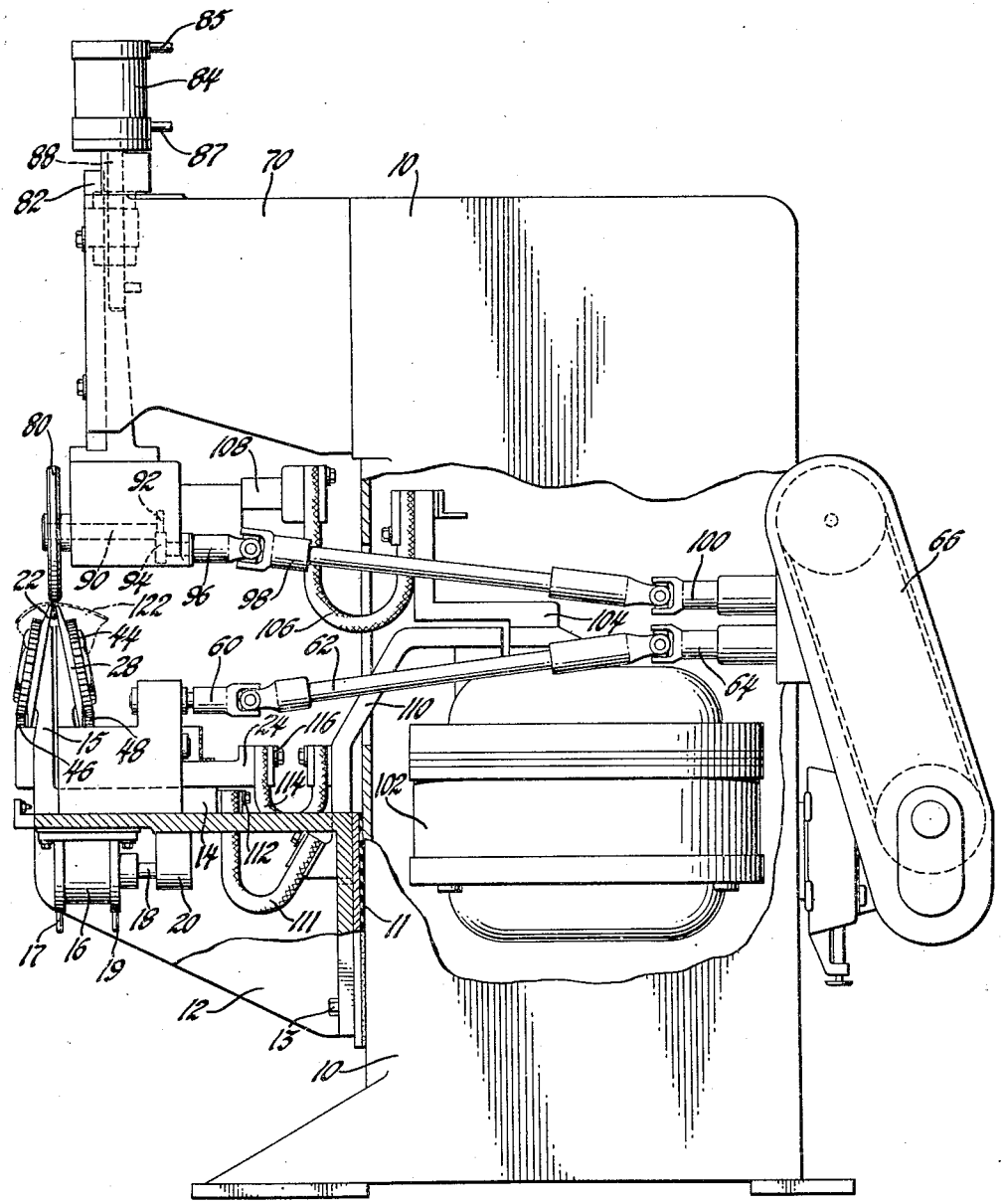
Figure 1 is a side elevational view with parts broken away and in section of a welding machine in accordance with one embodiment of the invention.

The welding machine shown in the drawings has a main frame 10 to which is fastened a knee

2

12 by means of bolts 13. The knee is insulated from the main frame 10 by means of suitable electrically insulating material 11 such as Micarta. The bolts 13 are insulated from the frame by washers and sleeves of a similar insulating material (not shown). An L-shaped bracket 14 is mounted on the knee and is slidable back and forth thereon a short distance by means of an air cylinder 16 carried by the knee which actuates a piston rod 18 connected to an arm 20 which in turn is fixed to the L-shaped bracket 14. The air line connections to the air cylinder are shown at 17 and 19. Secured to the L-shaped bracket 14 and hence movable therewith is an arm 15 which rotatably supports a roller or disc electrode 22. Supported on the knee 12 is a stationary bracket 24 to which is fixed an upwardly extending arm 26 similar to the arm 15. The arm 26 rotatably supports a roller or disc electrode 28 similar to the electrode 22 carried by the movable arm 15. The pair of lower roller electrodes 22 and 28 are symmetrically inclined with their upper portions closer to each other than are their lower portions as is seen in Figures 1, 3 and 4.

Fixed to the electrode 22 is a gear 42, while the electrode 28 has a similar gear 44 fixed thereto. Gears 42 and 44 are driven by means of pinions 46 and 48 respectively. The pinions are mounted on a stub-shaft 50 for rotation therewith, the pinion 46 also being movable axially along the stub-shaft 50, this movement being permitted by means of a splined-connection indicated by 52. The construction is such as to permit the pinion 46 to be driven or rotated by rotation of the stub-shaft 50 as the pinion 46 is moved back and forth with the L-shaped bracket 14. A suitable housing and support indicated generally by 55 fixed to bracket 14 supports the pinion 46 for movement with the bracket 14. The stub-shaft 50 also has a gear 56 fixed to its right-hand end as viewed in Figure 3. Gear 56 meshes with and is driven by a gear 58 fixed to a shaft 60. Shaft 60 is rotated by a shaft 62 which in turn is rotated by a shaft 64. Shaft 64 is rotated in any suitable manner as by means of suitable gearing (not shown in detail) and the drive 66.

Mounted on the head 70 of the machine above the pair of lower electrodes 22 and 28 is an upper roller electrode 80. The upper electrode is mounted for rotation in a slide 82 actuated by an air cylinder 84, piston 86, and piston rod 88 connected to the slide. Air connections for cylinder 84 are shown at 85 and 87. The roller electrode 80 is adapted to be rotated with a shaft 90 to which the roller electrode is fixed. Shaft 90 has a gear 92 fixed thereto which meshes with a gear 94 fixed to a shaft 96. Shaft 96 is driven by a shaft 98 which in turn is rotated by shaft 100 driven from drive 66.

Welding current is supplied to the electrodes in any desired manner. In the construction shown, 102 represents a welding transformer, connected by conductor 104, flexible connector 106 and connector 108 to the upper roller electrode 80, while the opposite side of the welding transformer is connected by fixed connector 110 to a flexible conductor 111 fastened at 112 to the movable L-shaped bracket 14 supporting the outer lower electrode and by a flexible conductor 114 fastened at 116 to the stationary bracket 24 supporting the inner lower electrode 28. As will be understood the connectors 106 and 111 have sufficient flexibility to take care of the relatively small movement imparted to the upper roller electrode 80 and the outer lower disc or roller electrode 24 by means of the air cylinders 84 and 16 respectively.

The welding machine is adapted to seam weld a welding strip or wire to a plurality of flanged parts of any kind desired. In the drawings the work to be welded consists of parts 120 and 122 which form a fender for an automobile. Part 120 has an inturned flange 124 while the part 122 has a corresponding inturned flange 126. Where the outer surfaces of the flanged parts come together adjacent the inturned flanges there is formed a generally V-shaped groove as best seen in Figure 4. The machine is designed to weld not only flanged parts having a straight seam but also flanged parts as shown having a seam curved in the direction of the length of the seam, the radii of the welding rollers in the latter instance necessarily being less than that of the seam curvature. The outer portions of the lower pair of welding electrodes 22 and 28 are tapered as shown at 128 and 130, respectively so as to clear the spaces between the flanges and the main bodies of the sheet metal parts. In cross section the outermost peripheral portions of the lower pair of rollers 22 and 28 are of curved shape as indicated at 132 and 134 respectively. The curved portions 132 and 134 are adapted to fit closely the corresponding curved portions 133 and 135 between the main body of the parts to be welded and the flanges thereof as perhaps best seen in Figure 4.

The elongated welding strip or wire is indicated at 136. The perimeter of a cross section of the preferred form as shown in the drawings has symmetrically arranged curved or arcuate portions 138 and 140 adapted to conform with the contacting portions of the parts to be welded. A reversely curved portion 141 joins the inner ends of the portions 138 and 140. The uppermost portion of the perimeter of the strip is of curved or arcuate shape as indicated at 142, the radius of curvature being about twice that of portions 138 and 140. Straight portions 143 and 144 join the outer ends of curved portions 138 and 140 with the ends of curved portion 142. While the strip having the cross section shown is preferred, a welding wire or strip of circular or other cross-sectional form may be employed. The lower portions of the form shown in the drawing closely contacts the parts to be welded and fits the generally V-shaped groove where the parts come together. The welding strip is flattened down during the welding operation so as to leave but a small amount of metal to be removed in order to leave a perfectly smooth outer surface.

The two lower roller electrodes are mounted for rotation on inclined axes so that the uppermost peripheral portions of the rollers which engage the work to be welded are inclined towards each other. The arrangement of the lower welding electrodes is such that the flanged portions of the parts to be welded are forced towards each other at a point immediately below the welding strip, as indicated in the drawings.

In carrying out the welding operation one end of the flanged parts (which have been previously spot-welded or otherwise secured together) are placed in the machine with the mating flanges extending in the space between the inclined lower electrodes, it being understood that the left-hand movable disc or roller electrode is at the left-hand end of its path of travel as viewed in Figures 1 and 3 and the upper electrode is in raised position. The left-hand lower electrode is then moved to the right as viewed in Figures 1 and 3 by means of the air cylinder 16 until the flanges of the work to be welded are under pressure. The welding strip 136 is then laid over the parts to be welded and the upper roller electrode 80 moved downwardly into pressure contact with the welding strip to hold the same in the V-shaped groove formed by the flanged parts. The welding current is then turned on and the three electrodes rotated at the same speed to move the flanged work pieces and the welding strip to the left as viewed in Figure 2 as the welding current passes between the parts. The pressure is such that the welding strip is flattened somewhat as the welding takes place. Figure 2 shows the seam partially welded, that portion from the left-hand of the work to the point of engagement by the electrodes being completed. The welding current and power for rotating the electrodes are disconnected when the parts have passed through the machine. The upper electrode is then raised and the movable lower electrode moved to the left as seen in Figures 1 and 3 whereupon the welded article may be removed from the machine.

Various changes may be made in the embodiment of the invention disclosed herein without departing from the spirit and principles of the invention.

I claim:

1. An apparatus for seam welding a welding strip to a pair of parts having inturned flange portions in contact with one another and having a generally V-shaped groove formed at the outer surface of the parts adjacent the inturned flanges within which a welding strip is placed which comprises, a pair of lower disc electrodes mounted for rotation on inclined axes so that the upper portions of the pair of rollers are closer to each other than are the lower portions, each of said disc electrodes tapering toward the peripheral portion thereof and being of arcuate shape in cross-sectional outline at the peripheral portion, the arcuate shaped surface adapted when in welding position to be in pressure contact with the inner junction between the flange and the main body of a flanged part, a slide carrying one of said pair of disc electrodes, an air cylinder for moving said slide and the electrode of said pair carried thereby to apply pressure to the flanged parts adjacent the inner junctions of the flanged parts with the main bodies of said flanged parts, a roller electrode above said pair of disc electrodes adapted when in welding position to apply pressure to the welding strip and to force the same into said generally V-shaped groove and toward said pair of disc electrodes, a slide carrying said roller electrode, an air cylinder for moving said slide to thereby apply pressure to the welding strip through said roller electrode, means for rotating the three electrodes to move the parts to be welded relatively to the electrodes, and means for applying welding current to the electrodes while the electrodes are rotating and the parts to be welded are under pressure.

2. An apparatus for seam welding a welding strip to a pair of parts having inturned flanged portions in contact with one another and having a generally V-shaped groove formed at the outer surface of the parts adjacent the inturned flanges within which the welding strip is placed which comprises, a pair of lower disc electrodes mounted for rotation on axes inclined toward each and having their peripheral portions of arcuate cross-sectional shape, said arcuate shaped portions adapted when in welding position to be in pressure contact with said flanged parts at the inner junctions of the flanges with the main bodies of said flanged parts, a roller electrode above said pair of lower electrodes adapted when in welding position to apply pressure to the welding strip and to force the same into said generally V-shaped groove and toward the pair of lower electrodes, means to move one of said pair of lower disc electrodes relatively to the other of the pair so as to apply pressure to the flanged parts adjacent the junctions of the flanges with the main bodies of the parts, means for moving the upper roller electrode into pressure contact with the welding strip, means for rotating the three electrodes to move the work to be welded relatively to the electrodes, and means for applying welding current to said electrodes while the electrodes are rotating.

3. The method of seam welding which comprises providing a plurality of parts having inturned flanged portions with the flanged portions in contact with one another and the outer surface of the adjacent parts having a generally V-shaped groove resulting from said inturned flanges, placing a welding strip in said generally V-shaped groove, applying pressure tending to force the adjacent flanges toward one another at said groove, and to force the welding strip into said groove, applying welding current to the flanged parts and strip while under pressure and continuously changing the point of application of the pressure and welding current until the entire seam is welded.

4. A method as in claim 3 in which the perimeter of a cross section of the welding strip consists of two symmetrically arranged arcuate portions adapted to conform generally with the side walls of the groove, a reversely curved portion connecting the inner ends of said arcuate portions, an upper arcuate portion having a considerably greater radius of curvature than that of said symmetrical arcuate portions and a straight side portion connecting the outer end of each symmetrical arcuate portion with an end of said upper arcuate portion.

5. A method as in claim 3 in which the seam is curved in the direction of its length.

6. An apparatus for seam welding a welding strip or wire to a pair of parts having inturned flanged portions in contact with one another and having a groove formed at the outer surfaces of the parts adjacent the inturned flanges within which the welding strip is placed which comprises, a pair of rotatable lower disc electrodes having their peripheral portions of arcuate cross-sectional shape, said disc electrodes adapted when in welding position to contact and apply pressure to flanged parts disposed between the upper portions of said disc electrodes, a roller electrode above said pair of disc electrodes adapted when in welding position to apply pressure to the welding strip and force the same into pressure contact with the walls of said groove, means to move one of said pairs of disc electrodes relatively to the other of said pair to apply pressure to the parts adjacent the junctions of the flanges with the main bodies of the parts, means to move the upper roller electrode into pressure contact with the welding strip, means for rotating the three electrodes to move the work to be welded relatively to the electrodes and means for applying welding current to said electrodes while they are rotating.

FRED J. SCHWARTZ.

REFERENCES CITED

The following references are of record in the file of this patent:

UNITED STATES PATENTS

| Number | Name | Date |
| --- | --- | --- |
| 444,928 | Thomson | Jan. 20, 1891 |
| 1,898,923 | Whitworth | Feb. 21, 1933 |
| 2,005,912 | Drake | June 25, 1935 |
| 2,265,943 | Laig | Dec. 9, 1941 |